235-382 SR
6/30/87 XR 4,677,435

United States Patent [19]
Causse D'Agraives et al.
[11] Patent Number: 4,677,435
[45] Date of Patent: Jun. 30, 1987

[54] SURFACE TEXTURE READING ACCESS CHECKING SYSTEM

[75] Inventors: Bertrand Causse D'Agraives, Ispra, Italy; Janny Mathieu; Patrick Jamar, both of Nancy, France

[73] Assignees: Communaute Europeenne de l'Energie Atomique (Euratom), Plateau du Kirchberg, Luxembourg; Association pour la Promotion de la Technologie (Promotech), Nancy, France

[21] Appl. No.: 755,582

[22] Filed: Jul. 16, 1985

[30] Foreign Application Priority Data

Jul. 23, 1984 [FR] France ................................ 84 11643

[51] Int. Cl.[4] .......................... G06F 7/04; G06K 5/00
[52] U.S. Cl. ................................ 340/825.31; 235/382
[58] Field of Search ....................... 340/825.31, 825.34, 340/825.33; 235/382.5, 375, 380, 382, 448

[56] References Cited

U.S. PATENT DOCUMENTS

| | | | |
|---|---|---|---|
| 3,637,990 | 1/1972 | Bayha et al. | 340/825.33 |
| 4,218,674 | 8/1980 | Brosow | 235/380 |
| 4,298,792 | 11/1981 | Granholm et al. | 235/375 |
| 4,519,228 | 5/1985 | Sornes | 235/382.5 |
| 4,568,936 | 2/1986 | Goldman | 340/825.34 |

FOREIGN PATENT DOCUMENTS

| | | |
|---|---|---|
| 2107529 | 9/1971 | France . |
| 2325992 | 9/1976 | France . |
| 2457524 | 5/1979 | France . |
| 2533340 | 9/1982 | France . |
| 2072390 | 9/1981 | United Kingdom . |
| 2097979 | 4/1982 | United Kingdom . |

OTHER PUBLICATIONS

"Surface Topography, A Remarkable Method for the Identification of Seals or Structures in General", B. C. D'Agraives, pp. 403–409.

*Primary Examiner*—Donald J. Yusko
*Attorney, Agent, or Firm*—Oblon, Fisher, Spivak, McClelland & Maier

[57] ABSTRACT

Surface texture reading access checking system. The identification information attached to each support object serving as a key is constituted by the texture of a surface portion of said object. A reader reads this information and communicates it to the processing means, which carry out a comparison between the signal read and recorded signals. Application to the production of locks or access checking means for data processing, telematic, banking and similar systems.

13 Claims, 6 Drawing Figures

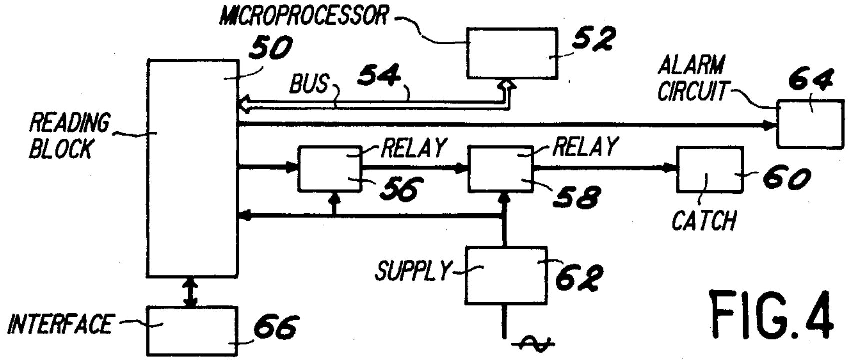
FIG. 4
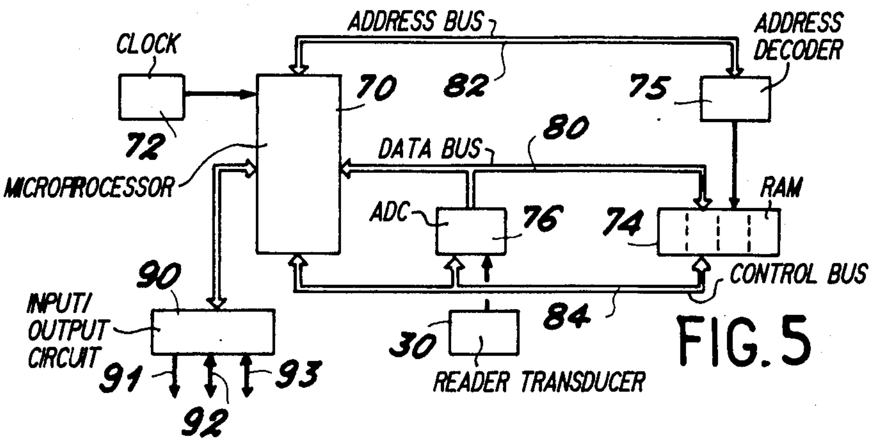
FIG. 5
FIG. 6
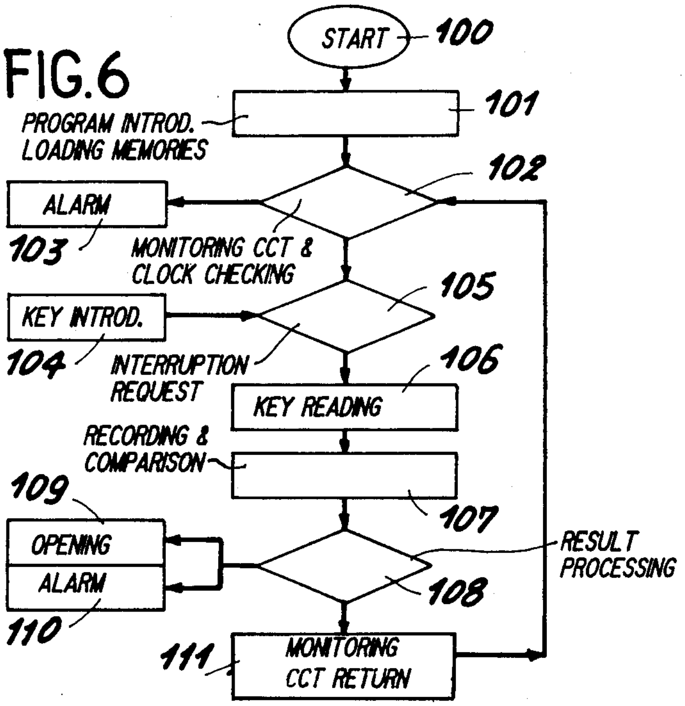

SURFACE TEXTURE READING ACCESS CHECKING SYSTEM

BACKGROUND OF THE INVENTION

The present invention relates to an access checking system, i.e. a system making it possible to initiate an action equivalent to an authorisation following the checking of the identity of an object introduced into said system.

To a certain extent the system according to the invention constitutes a "key-lock" system, provided that these terms are given a broad sense. The word "key" must be understood to designate a support object provided with an identity and the word "lock" is understood to mean a member able to recognise the identity in question and control an action. However, the support object according to the invention is not necessarily in the traditional form of a key. It can have a random shape and can in particular be a card. With respect to the "control member" function, it is not necessarily limited to the action on the latch or bolt of a door, but can correspond to an access authorisation to a random data processing, telematic, bank or similar system. However, in order to show the originality and essential features of the invention, the variant of the system assuming the form of the traditional "key-lock" system will be used as a basis, but without this example having any limitative character.

The very principle of the lock mechanism is to give a portable object (the key) an identity (e.g. a profile) and to provide a member (the lock) able to recognise this identity and initiate an action. According to this known principle, the key is a reproducible object, because obviously several people must be able to have the same key (the members of one family, the same company, etc.). As the lock is linked with the special form given to the key, it can only cooperate with a single type of key.

Recently more sophisticated systems have appeared and these can be designated by the generic term of "electronic locks". In such systems, the identity is translated into a code written on an optical or magnetic track, which is placed on a type of credit card. However, the philosophy of the system remains the same, each key (in the present case each card) being reproducible. However, as in such improved systems the identity information is of a numerical and no longer a mechanical nature, it is possible to record several different identities in an electronic memory. Several different keys are then able to open the same lock. These keys can be allocated to different authorised persons, but can also be used by maintenance or security services.

In such systems, several digital words are written into a random access memory, which to a certain extent acts as a reference and these same words are written on to several cards. When one of these cards is introduced into a card reader, the code written on the card is detected and the resulting digital signal is compared with various reference words written in the memory. A comparitor establishes whether or not coincidence exists between the read word and one of the stored words. In the affirmative, a signal is emitted for controlling a random action, e.g. the opening of a catch.

For example, such a system is described in French patents Nos. 2 107 529, 2 325 992, 2 457 524 and 2 533 340.

Although satisfactory in certain respects, these systems suffer from a major disadvantage linked with the absence of confidentiality of the code carried by the card. Thus, it is easy to read the code inscribed on a stolen card and to re-write said code on a new card. In other words there is a real risk of fraudulent duplication of the support.

The object of the invention is to obviate this disadvantage. This is achieved through the use of a key which, by its very nature, is not reproducible. This characteristic is obtained by choosing as the information able to define the identity of a key a natural information constituted by the texture of the surface of a member and not information artificially produced (such as a tooth system or a magnetic or optical property of a strip). This information is of a complexity such that it is not reproducible. In addition, said information is unique, because even two objects which are identical in the macroscopic sense are in reality different on descending to the level of their surface texture. There is obviously no reason why an artificial texture should not be added to the natural texture in the form of scratches, streaks, marks, etc.

The idea of using the texture of a surface as the identification means for certain objects is not new. The article by B. C. D'Agraives et al entitled "Surface Topography, a remarkable method for the identification of seals or structures in general", published in "Proceedings of the 3rd Esarda Symposium on Safeguards and Nuclear Material Management", Karlsruhe, Federal Republic of Germany, 6/8.5.1981, already describes the properties and interest of surface textures. This teaching also appears in British patent application No. 2 097 979 published on 10.11.1982 in the name of the European Atomic Energy Community (EURATOM) and entitled "Utilisation of surface textures as a random marking or unique identity".

The present invention takes up this idea again by applying it to the field of access checking systems.

The choice of the surface texture as an information source for the marking of key runs counted to all the aforementioned known principles because, by its very nature, said information is not reproducible. Thus, unlike in the past, the lock is no longer designed to recognise a predetermined information, because a texture is a virtually random magnitude and is consequently unforeseeable. Thus, it is no longer possible to load the memory of the lock with an information which has been determined beforehand, as was the case with the Prior Art systems. It is pointed out in this connection that in conventional electronic locks and as described in particular in French patent No. 2 325 992, loading takes place with the aid of a special card, which carries programming information relative to the lock. This information consists of lists of codes to be accepted and lists of codes to be refused. This programming card is introduced into the reader, which identifies it as such and which is designed so as to modify the list of stored codes.

This known system is still subject to a fraud risk, because it is possible to falsify the programming card by giving it forged codes. Thus, the lock can be controlled by cards carrying these forged codes.

The choice of the surface texture as the identification means makes it necessary to modify the authorised information loading procedure, so that it is impossible to forge or counterfeit the same. To this end, the lock according to the invention which, like electronic locks, is provided with different memory locations is such that these locations can only receive the reference information by reading keys which are authorised to open the lock. In other words, an information written on a support is no longer written into the lock memory. The reverse order is used according to the invention, i.e. keys are produced with a random texture and the locks are subsequently conditioned as a function of said keys.

According to the invention, the quantity used for identifying the key is a continuous analog quantity and is no longer a digital value. Thus, an analog procedure could optionally be adopted for the comparison operation between the reference quantity and the read quantity. However, it is natural that preference is given to the conversion of the analog signal into digital form, followed by digital processing.

Another original feature of the lock according to the invention is that the means responsible for reading the information contained in the support supplied thereto is a texture reader and no longer a magnetic reader.

It is pointed out that the advantages of the system according to the invention are not acquired to the detriment of the possibilities of conventional electronic systems which are entirely retained, i.e. temporary validation of a key, centralised management of a system of locks, counting the number of interventions of a particular key, etc.

SUMMARY OF THE INVENTION

In general terms, the present invention can be defined as follows. It relates to an access control system making it possible to initiate an action after checking the identity of a support object introduced into said system and carrying an identification information, said system comprising in per se known manner a reader able to receive such a support object and read the information belonging to the same, a storage means having several memory locations loaded by reference informations corresponding to an authorised support object system, a comparison means between on the one hand a signal supplied by the reader when a random support object is introduced into the station and on the other hand each of the informations stored in the memory locations, said comparison means determining the degree of coincidence between the information corresponding to the support object introduced into the reader and one of the informations contained in the memory locations of the storage means and a circuit connected to the comparison circuit and supplying, when the degree of coincidence is adequate, a signal constituting a signal for initiating an action, wherein the identification information attached to each support object is constituted by the texture of a surface portion of said support object, the reader then being a surface texture reader, the loading of a reference information taking place by introducing an authorised support object into the reader, reading said support object and storing the signal read in one of the locations in question.

According to a first embodiment, each support object is in the form of a key with a head which can be manually grasped and a body having at least one planar portion carrying the surface portion whose texture is read.

According to an advantageous variant, the key body is metallic and preferably made from an alloy, which gives a particular complexity to the texture.

According to another embodiment, each support object is in the form of a card, whereof part of the surface is used for reading the texture. This card can be made from a flexible plastic.

According to yet another embodiment, the key can have a cylindrical shape with reading which is either rotary along the circumference or linear along a generatrix. The key can have a tubular appearance, reading taking place inside or outside the tube.

According to yet another embodiment, the key can consist of a conventional object such as a ballpen.

The reader comprises a support object reception block, a transducer able to translate the key relief into an electrical signal (e.g. a piezoelectric point), said transducer being placed on an arm and a means for the relative displacement of the arm and the support object along a surface portion thereof. According to an advantageous embodiment, the arm is connected to a displacement means, which is moved when the support is immobilised in the reception block. This arm displacement means can be a clockwork connected to an arming arm, whereof one end is displaced by the introduction of the support object into the reception block. However, said arm displacement means can also be an electric motor.

According to another embodiment, the reading point is stationary and support object reading takes place during the introduction thereof into the reception block. However, in another embodiment, reading can take place during the withdrawal of the key from the reception block.

The comparison circuit preferably comprises a correlator followed by a threshold circuit. It is particularly useful to use a correlator here, because the measuring signal is of an analog nature and it is sampled at a large number of points, e.g. 512, 1024 or more points. The comparison between the read signal and the reference signal can give rise to the correlation method, whereas in the Prior Art of electronic locks, there is a bit by bit comparison of words of several bytes. Other more or less complex processing methods can also be used.

THE INVENTION IS DESCRIBED IN GREATER DETAIL HEREINAFTER RELATIVE TO NON-LIMITATIVE EMBODIMENTS AND THE ATTACHED DRAWINGS, WHEREIN SHOW

FIG. 4 is a block diagram of an installation according to the invention.

FIG. 5 is a diagram of an electronic card.

FIG. 6 is a simplified flowchart illustrating the basic program used.

DETAILED DESCRIPTION OF THE PREFERRED EMBODIMENTS

Figure 1:
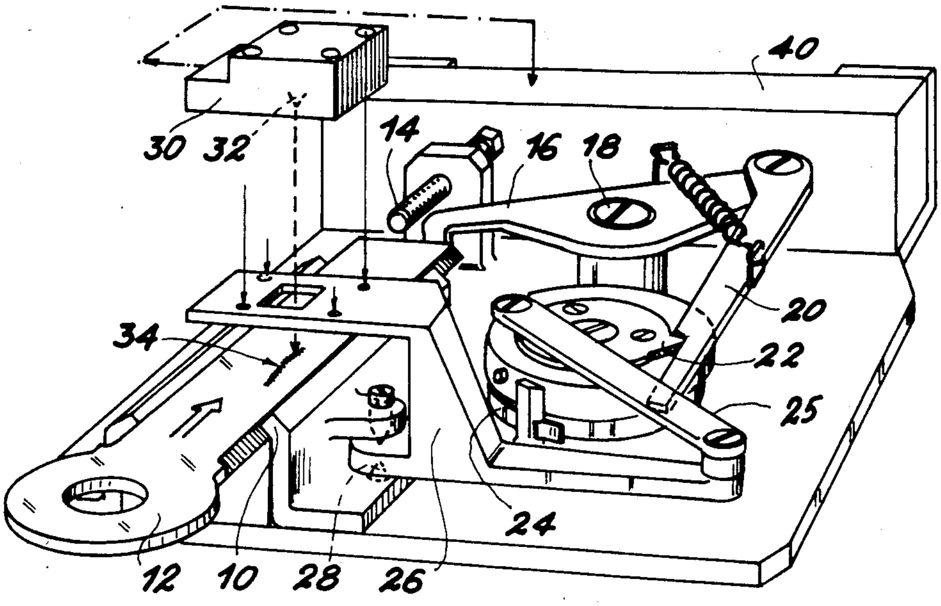
FIG. 1 is a diagram of the key reading block.
Figure 2:
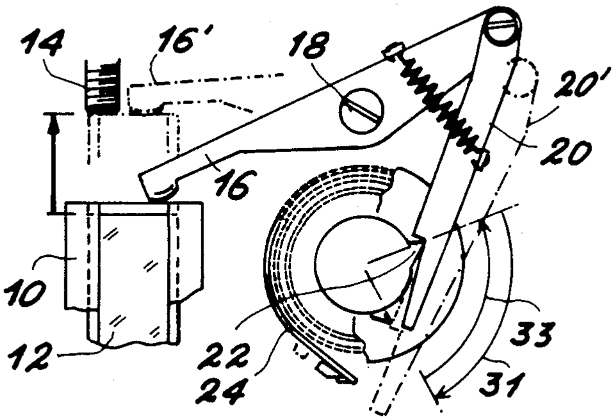
FIG. 2 is a detail of the clock system arming mechanism.
Figure 3:
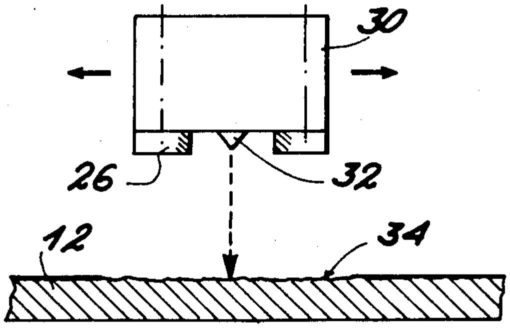
FIG. 3 is a diagrammatic section at the reading point.

The following description and particularly that relative to FIGS. 1–3 relates to the special case of a support object in the form of a metal bar read by a piezoelectric point placed at the end of an arm moved by a clockwork mechanism. However, as stated hereinbefore, other constructions are also possible.

In general terms, the reader can use all known texture sensors covered by standards, particuarly French standard NF-E-05-050 of December 1970 entitled "Surface state of products-general details of electronic sensor equipment".

The device shown in FIGS. 1, 2 and 3 comprises a reception block 10 for a key 12 having a trapezoidal section, an abutment 14, a first arm 16 displaced by the end of the key and mobile about a shaft 18, said arm being articulated on a second arm 20, which cooperates with a toothed wheel 22 arming a spiral spring 24. When key 12 abuts against abutment 14 (cf FIG. 2), arm 16 is in position 16', arm 18 in position 18' and wheel 22 is released. Spring 22 then controls the displacement of a third arm 25 articulated on to a fourth arm 26, pivoting about an access 28 and whose end carries a sensor 30, provided with a reading point 32. The raising of the system corresponds to the angular displacement 31 in FIG. 2 and the reading phase to the displacement 33. The latter corresponds to a reading range 34 located on the upper face of the key and in the form of a circular arc. However, it is also possible to provide a system in which the reading range is linear. Sensor 30 supplied an analog electric signal applied to an electronic circuit 40. The latter comprises all or part of the processing means illustrated in FIGS. 4–6.

FIG. 4 firstly shows the general diagram of an installation realising the present invention. It is possible to see a reading block 50 connected to a microprocessor 52 by a connecting bus 54. Block 50 is connected to an autorelay 56, which is connected to a relay 58 constituted by the control relay of member 60, which is either an electric catch or a bolt. The assembly is connected to a general power supply 62. Block 50 can also be connected to an alarm circuit 64 and to an interface 66 permitting the possible connection with another lock of the same type.

The essential features of the processing means are brought together on an electronic card, although in certain applications it would be possible to centralise all the processing operations relating to a group of locks in a microcomputer designed for this purpose. Such a card is shown functionally in FIG. 5. It comprises a microprocessor 70 (e.g. of type 6800 or 6809), a clock 72, a random access memory 74 having several memory locations, an address decoder 75 and an analog-digital converter 76 connected to reader sensor 30. The data flow on a bus 80, the addresses on a bus 82 and the control instructions (read-write into memory and sampling-conversion) on a bus 84. Microprocessor 70 is connected to an input-output circuit 90, which is connected by a connection 91 to the electric catch to be controlled (across relays, cf FIG. 4), by connection 92 to a switch and by connection 93 to other locks or miscellaneous members.

The system functions as follows. The analog signal supplied by sensor 30 is sampled and each sample is converted into digital form by converter 76. Microprocessor 70 receives all the read digital signals and has access to the various reference signals stored in 74. With the aid of these two data, it carries out a correlation and compares the result obtained with a predetermined degree of correlation.

Microprocessor 70 also ensures the initiation of a signal in the case of an attempted forced entry into the box or monitoring members with erasure of all the memories, which prevents the data processing and electrical opening control; management of the schedule, priorities and lockouts; presence checking. These functions can be fulfilled either by wired electronic circuits, or by a data processing program.

Naturally, this diagram can give rise to different embodiments as a function of the applications. It is possible to provide a version with an autonomous power supply and the bringing of the microprocessor into the inoperative state. Part of the random access memory can also be placed in an attached box located outside the lock, whilst a supplementary microprocessor acting as a central management means can also be provided when there are numerous keys or readers. The memory contained in each rader then acts as a buffer waiting for the central unit to be available.

According to measurements carried out by the inventors, the total opening time of a lock folliwng the introduction of a key is less than 3 s. for 10 keys and less than 9 s. for more than 10 keys.

The card described hereinbefore can communicate with any data processing periphery, such as a printer, keyboard, video screen, bulk store, etc.

The simplified flowchart for a basic program for the putting into action of these processing means is illustrated in FIG. 6, where different operations of the program are given the following meanings:

100: Program start.
101: Program introduction and loading memories.
102: Monitoring circuit and clock checking.
103: Alarm.
104: Key introduction.
105: Interruption request.
106: Key reading.
107: Recording and comparison.
108: Result processing.
109: Opening decision.
110: Alarm.
111: Monitoring circuit return.

What is claimed is:

1. An access control system comprising:

plural authorized support objects each having a relief surface texture;

a reception block able to receive said support objects;

a contact transducer provided in said reception block, said transducer being able to translate the relief surface texture into an electrical signal;

a random access memory having plural memory locations, said random access memory being able to be connected to said transducer when an authorized support object is introduced into said reception block and to receive and store in one of said memory locations the corresponding electrical signal delivered by the transducer;

a comparison circuit connected between the memory and the transducer, said comparison circuit determining the degree of coincidence between the signal supplied by the transducer when a random support object is introduced into the reception block and each of said signals stored in the memory locations of the memory; and a circuit connected to said comparison circuit and supplying, when a predetermined degree of coincidence is adequate, a signal initiating an access control action.

2. A system according to claim 1, wherein each support object has the form of a key with a head which can be manually grasped and a body having at least one planar part which carries the surface portion whose texture is to be read.

3. A control system according to claim 2, wherein the key body is metallic.

4. A control system according to claim 3, wherein the key body is made from an alloy.

5. A control system according to claim 1, wherein each support object is in the form of a card, whereof one surface part is used for a texture reading.

6. A system according to claim 1, wherein the reader comprises a support object reception block, a piezoelectric point placed on an arm, a means for the relative displacement of the arm and the support object along a surface portion thereof.

7. A system according to claim 6, wherein the arm is connected to a displacement means which is moved when the support abuts in the reception block.

8. A system according to claim 7, wherein the arm displacement means is a clockwork mechanism connected to an arming arm, whereof one end is displaced by the introduction of the support object into the reception block.

9. A system according to claim 7, wherein the arm displacement means is an electric motor.

10. A system according to claim 6, wherein the piezoelectric point is stationary and support object texture reading takes place during the introduction of the same into the reception block.

11. A system according to claim 1, wherein the reader comprises an analog-digital converter, the signal supplied by the reader then being digital.

12. A system according to claim 1, wherein the processing circuit comprises a microprocessor.

13. A system according to claim 12, wherein the microprocessor performs a correlation between the signal read and the reference signals.

* * * * *